Feb. 26, 1957   F. O. WISMAN   2,783,341
PROBE FOR LIQUID LEVEL INDICATOR
Original Filed March 13, 1951

*INVENTOR.*
FRANKLIN O. WISMAN

*Robert J. Peck*

ATTORNEY

United States Patent Office 2,783,341
Patented Feb. 26, 1957

2,783,341

PROBE FOR LIQUID LEVEL INDICATOR

Franklin O. Wisman, South Bend, Ind., assignor to Bendix Aviation Corporation, Baltimore, Md., a corporation of Delaware Continuation of abandoned application Serial No. 215,261, March 13, 1951. This application August 18, 1954, Serial No. 450,578

2 Claims. (Cl. 201—48)

The instant application constitutes a continuation of application Serial Number 215,261, filed March 13, 1951, now abandoned.

This invention relates generally to improvements in apparatus for indicating liquid level and, in particular, discloses a greatly simplified arrangement for giving substantially instantaneous indications of predetermined liquid levels.

There have been many developments in the art of liquid level measurement and, broadly speaking, there have evolved many techniques for accomplishing this type of measurement. Specifically, there are float gages, sight glasses, photoelectric devices, electric capacitative devices, electric resistance devices, and other means, now in use, in one form or another. The present invention is a result of development work in the specialized field of measurement with electric resistance devices.

In some resistance devices, the body of the liquid is included in the electrical circuit and its level influences the value of resistance measured between electrodes suitably placed in relation to the liquid. In other forms of resistance measuring devices, the heat dissipating characteristics of the liquid under measurement are utilized to influence the value of resistance of an associated resistor, which in turn can be translated into an output indication calibrated in terms of liquid level. Thus, there are many arrangements in the prior art wherein a resistor having a positive temperature coefficient of resistance is associated with a body of liquid, the resistor usually extending from the top to the bottom of the liquid storage vessel. A continuous current flows through the resistor and in accordance with well-known principles of electricity, a certain amount of heat will be generated by the current flow, thus causing the resistor to self-heat. This self-heating effect serves to influence the value of resistance of the resistor, due allowance being given to the rate of dissipation of induced heat from the resistor to its surrounding medium. Assuming air or other like gas above the liquid in the storage vessel, the heat of the resistor will be dissipated into the air and liquid, and its rate of dissipation will influence the temperature of the resistor which in turn will influence the value of resistance of the resistor.

The capability for heat transfer of most liquids is usually much greater than that of air or other like fluids, resulting in different rates of heat dissipation for those portions of the resistor surrounded by the different mediums. Therefore, with the resistor completely submerged by the liquid, dissipation of the current-induced heat will be at a maximum and the resistor will have a minimum value of resistance. Should the storage vessel be emptied of liquid, then the resistor will be completely surrounded by air and the resulting decreased rate in heat dissipation will cause the temperature of the resistor to rise, thereby raising the resistance to a maximum value. The resistance will thus range between a minimum and maximum value, depending upon the level of the liquid in the storage vessel. Obviously, the range in resistance can be translated into an output indication calibrated to show liquid level. Here, though, we find the prior art to be concerned with relatively small values in total resistance change which in turn means that sensitive electrical measuring circuits are needed to measure the incremental, as well as total, changes in resistance corresponding to liquid level changes. Such circuits usually include a Wheatstone bridge and a sensitive D'Arsonval movement as translating devices—or sensitive precision relays would be required to perform the translation of resistance change to output indication. Furthermore, with the devices of the prior art, the relatively low temperature coefficient of resistance existing in the liquid level sensing resistors causes the units to respond very slowly to changes in liquid level, thus adding to the inherent disadvantages of such systems. In summary, and only highlighting some of the disadvantages of the prior art, the following factors detract from their utility and accuracy:

(1) Low temperature coefficient of resistance giving rise to:

(a) Slow response of resistor to changes in liquid level;

(b) Small total change in resistance for the range of liquid level measured;

(c) Precision sensitive translating devices usually embodying D'Arsonval movements or delicate relays.

Into this setting is projected the present invention embodying a small rugged resistor and a simple electrical circuit for almost instantaneously indicating a predetermined level of liquid. The resistor employed is a rugged ceramic body having a negative temperature coefficient of resistance, well-known in the art as a thermistor. The thermistor is usually a sintered combination of vitreous ceramic materials and various metal oxides, the latter group of materials being generally known as semiconductors. Its physical dimensions can be that of an ordinary pencil lead, less than $\frac{1}{2}''$ long with a diameter of $\frac{1}{32}''$, and its response to changes in liquid level can be on the order of a few seconds. Moreover, the temperature coefficient of resistance is high, thus producing resistance changes of considerable magnitude.

In the embodiment to be described, an ordinary battery can be connected in series with a light bulb and a thermistor, and the thermistor, when submerged by the liquid, will have a resistance value high enough to prevent current flow or sufficient strength to illuminate the light bulb. Should the liquid level fall to the extent of uncovering the thermistor and exposing its external surfaces to the atmosphere above the liquid, the retarded rate of heat dissipation will cause the thermistor to heat rapidly and thus undergo a substantial change in resistance. In the embodiment shown, in the space of a few seconds, the change in resistance will be enough to increase the current flow in the circuit to the point where the light bulb is brightly illuminated.

Thus, for all practical purposes, the thermistor performs the operation of a simple on-off electrical switch without the use of any contacts. Moreover, precision or sensitive translating devices are unnecessary in view of the large change in resistance by the thermistor permitting control of current flow in easily measurable ranges. Furthermore, a thermistor permits almost instantaneous indications of any change in a predetermined level of liquid.

The invention will now be described in detail, in conjunction with the single sheet of drawings annexed hereto, in which.

Figure 1:
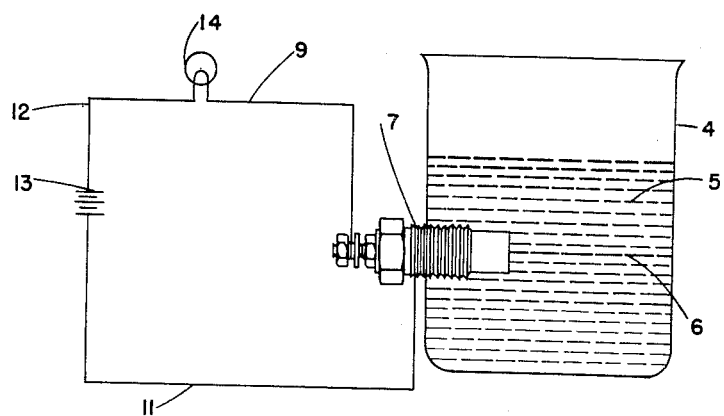
Figure 1 is a generally schematic showing of a simple alarm circuit for liquid storage systems incorporating a liquid level sensing probe in accordance with the invention.
Figure 2:
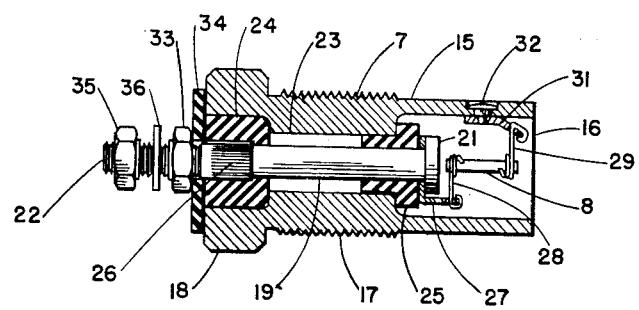
Figure 2 is a view, partly in section and partly in elevation, showing the details of the sensing probe.
Figure 3:
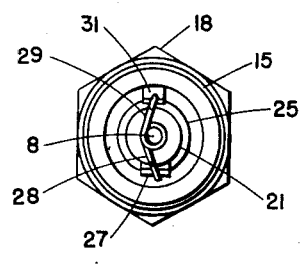
Figure 3 is an end view of the probe shown in Figure 2.

Referring now to the drawings, Figure 1 discloses a storage vessel 4 for a body of liquid 5 wherein it is desired to have a suitable indication of any change in liquid level below the reference or critical level 6. A cartridge 7 is inserted through the walls of vessel 4 so as to position the rod-type thermistor 8 axially with respect to reference level 6, and in heat transfer relationship with the body of liquid 5.

Suitable electrical leads 9, 11 and 12 are used to connect the thermistor 8 in series with a battery 13 and a lamp 14.

The cartridge 7 comprises a tubular plug 15 having a bored-out end 16 for receiving the thermistor 8 and a threaded portion 17 for cooperating with a suitable threaded aperture in vessel 4. The plug 15 may have a hex-head 18 so that the plug can be conveniently secured in its proper position in the wall of vessel 4.

Extending through the solid portion of plug 15 there is a smaller bore 23 surrounding a conducting bolt 19 having a head 21 and an externally threaded portion 22. The bore 23 is counter-bored at its outer extremity to receive the washer 24 and a washer 25 in the form of a plug is located at the inner extremity of bore 23. The washers 24 and 25 are of electrical insulation and serve to locate the bolt 19 spaced apart from the body of the cartridge 7. The bolt 19 has a serrate portion 26 cooperating with washer 24 to hold the bolt 19 against rotation in its mounting.

A bracket 27 has an annular portion thereof clamped between washer 25 and head 21 of bolt 19 and is suitably apertured to receive one end of a supporting filament 28. This end of filament 28 may be soldered to the bracket 27 and its other end coiled around one end of thermistor 8 and then soldered thereto.

Normally, the thermistor 8 has its ends covered with a conductive coating, such as a copper spray or the like, to insure good contact with the associated filaments.

A similar filament 29 has one end coiled around the other end of thermistor 8 and soldered thereto and has its other end affixed to bracket 31 in a manner similar to the arrangement for filament 28 and bracket 27. A suitable rivet 32 is provided to secure bracket 31 to plug 15. Thus, the thermistor 8 is mounted axially in the plug 15 and for most installations of the plug 15, the thermistor 8 will be parallel to the surface of the liquid being measured.

A nut 33 and washer 34 (of insulating material) mounted on the threaded end 22 of bolt 19 hold the entire assembly tightly together and nut 35 and lock washer 36 provide means for securing one end of lead 9 to the cartridge element 7. In Figure 1, lead 11 is shown affixed to plug 15. Practically, such an arrangement is usually unnecessary, for lead 11 is connected to ground and the plug 15 is electrically insulated from lead 9 and is connected to ground. Thus, the circuit for the thermistor 8 would be from lead 9 to bolt 19 to filament 28 via bracket 27, through the thermistor and to ground via filament 29 and bracket 31.

The schematic arrangement shown in Fig. 1 will give a visible alarm within a few seconds of any fall in the level of liquid 5 below the critical level 6. In a typical application of the system shown in Figure 1, the vessel 4 could be the hydraulic fluid reservoir of a hydraulic fluid system on a bus. The system may have a high volumetric capacity pump as one of its component parts, and in the event of a line rupture in the hydraulic system, the pump would evacuate the reservoir in the space of a minute or less. With certain types of pumps, not only would the hydraulic fluid be needlessly wasted but the pump could be irreparably damaged if it continued to operate without fluid. Thus, a sensing cartridge 7, suitably located in the reservoir 4, would instantly warn the operator of the bus of a dangerously low level of liquid in the reservoir.

In the application of the system described above, the thermistor has a resistance of 70 ohms at 125° F. hydraulic fluid temperature, with a current value on the order of 185 milliamperes, such current being high enough to cause self-heating of the thermistor. The negative temperature coefficient of resistance is approximately two and one-half percent change in resistance per degree change in centigrade temperature. Under such conditions, with a standard number 55 automobile lamp and a regulated source of 14.3 volts, the normal current in the circuit is on the order of 185 milliamperes, leaving the lamp completely dark. The thermistor is about 1/32" in diameter and, with a fall in liquid level of 1/32" sufficient to fully expose the thermistor to atmosphere, the resistance drops approximately 70% to 19 ohms, and permits 380 milliamperes to flow in the circuit, which is more than enough to brightly illuminate the light bulb 14. Once the thermistor 8 is uncovered by the liquid, the alarm lamp will light in about five to seven seconds, depending upon the temperature of the hydraulic fluid. The internal resistance of the light bulb 14 serves as a ballast resistor in the circuit to limit the maximum value of current flow to thereby prevent the thermistor 8 from excessive self-heating.

As heretofore stated, the above phenomenon results from the difference in heat transfer characteristics of liquids, as compared with air or other gases. Since the thermistor 8 never exhibits zero conductivity, it will always achieve a degree of self-heating as a consequence of current flow. When the thermistor is submerged in liquid, the heat developed is dissipated into the liquid with great facility and its conductivity remains low. When the thermistor emerges into the air, the heat developed (usually on the order of a few watts) can be dissipated with much less facility than in liquid and the temperature of the thermistor rises. This temperature rise causes a corresponding increase in conductivity, which in turn causes increased current to flow and thus additional self-heating, until a value of current is attained sufficient to brightly illuminate the alarm lamp.

By placing the thermistor parallel to the surface of the liquid, it is possible to obtain an alarm for variations in liquid level exceeding but slightly the thickness of the thermistor. That is to say, in the present invention the rod 8 has a diameter or thickness of about 1/32 of an inch; therefore, if the liquid level is such that liquid just covers the thermistor and thence the level falls until the thermistor is uncovered, the alarm will be given within a few seconds of the change in the level and almost coincident with the critical level under observation. If the rate of descent of liquid level is not too great, then the few seconds time delay of the thermistor will have little effect on the accuracy of response. In fact, this delay of a few seconds could be easily compensated for when positioning the thermistor. In control applications, such a compensation would have to be taken into account when designing the unit.

A secondary feature resulting from use of a thermistor in the system of Figure 1 is that such units can be designed to give an alarm for excessive liquid temperatures as well as changes in liquid level. Thus, for the bus installation described, normal hydraulic fluid temperatures were in the neighborhood of 125° F. with permissible increases up to 165° F. The thermistor was designed to give an alarm for liquid temperatures over 165° F. in addition to its function as an indicator of liquid level.

In summary, it is evident that many advantages result from the use of a thermistor as a sensing element in a liquid level system, among which the more important are as follows:

(1) Substantially instantaneous indications of change in predetermined levels of liquid.

(2) Simple electrical translating circuits and devices for converting liquid level changes into output indications.

(3) Small rugged resistor elements adapted to be easily and conveniently located in a liquid storage system.

(4) Accurate indications of liquid level, normally within a tolerance range determined by the thickness of the thermistor.

Although in the embodiment shown, a lamp is utilized to give a visible alarm of changes in liquid level, other simple alarm devices, such as an electrically actuated buzzer, could be interchanged with the lamp.

What is claimed and desired to be secured by United States Letters Patent is:

1. A probe particularly adapted for installation in a container having therein a fluid medium and a gaseous medium possessing different heat transfer properties, comprising a thin elongated combined ceramic and metal oxide resistor having a high negative temperature coefficient of resistance, a hollow metallic cartridge having an opening in the wall thereof for supporting said resistor in the container in contact with the fluid medium, an elongated member of conducting material projecting into said cartridge, an insulator surrounding and rigidly connected to the outer extremity of said member, said insulator being securely fixed in the outer extremity of said cartridge and supporting said member axially of said cartridge and in spaced relation to the surrounding walls of the latter, said resistor having its end portions provided with a coating of conductive material, a grounding element in the form of a filament of conducting material connecting one end of the resistor to the adjacent wall of the cartridge and another filament of conducting material connecting the opposite end of said resistor to the adjacent inner end of said member, said resistor being supported by said filaments in a plane substantially parallel to the axis of said cartridge beyond the inner end of said member.

2. A probe particularly adapted for installation in a container having therein a fluid medium and a gaseous medium possessing different heat transfer properties, comprising a thin elongated combined ceramic and metal oxide resistor having a high negative temperature coefficient of resistance, a hollow metallic cartridge in the form of an externally-threaded sleeve having an open inner end for supporting said resistor in the container in contact with the fluid medium, a rigid conductor rod projecting axially into said sleeve and terminating at its inner end short of the inner open end of the sleeve, the outer end of said rod constituting a terminal for connection to an external circuit, insulator means supporting said conductor rod axially of the sleeve in spaced relation to the surrounding wall of the latter, said resistor having its opposite end portions provided with a coating of conducting material, a grounding element in the form of a filament of conducting material connecting one end of the resistor to the adjacent wall of the cartridge and another filament of conducting material connecting the opposite end of said resistor to the adjacent inner end of said rod, said filaments resiliently supporting said resistor in a plane substantially parallel to the axis of the sleeve beyond the inner end of said rod.

References Cited in the file of this patent

UNITED STATES PATENTS

| | | |
|---|---|---|
| 2,165,569 | Obermaier | July 11, 1939 |
| 2,553,603 | Peters | May 22, 1951 |
| 2,616,949 | Cade | Nov. 4, 1952 |

FOREIGN PATENTS

| | | |
|---|---|---|
| 7,462 | Great Britain | of 1914 |